United States Patent [19]

Mentzer

[11] Patent Number: 5,063,093
[45] Date of Patent: Nov. 5, 1991

[54] SIMULATED MARBLE AND PROCESS OF PREPARATION

[75] Inventor: Nancy E. Mentzer, Lancaster, Pa.

[73] Assignee: Armstrong World Industries, Inc., Lancaster, Pa.

[21] Appl. No.: 402,352

[22] Filed: Sep. 5, 1989

[51] Int. Cl.$^5$ ............................................. B44E 9/04
[52] U.S. Cl. ........................................ 428/15; 156/61; 264/245; 428/141
[58] Field of Search ................ 264/245; 428/15, 141; 156/61

[56] References Cited

U.S. PATENT DOCUMENTS

| | | | |
|---|---|---|---|
| 1,537,725 | 5/1925 | Zottoli | 156/61 X |
| 1,560,450 | 11/1925 | Wesely | 156/61 X |
| 1,573,425 | 2/1926 | Steed | 156/61 X |
| 3,394,021 | 7/1968 | Bush et al. | 428/15 X |
| 3,471,307 | 10/1969 | Rostoker | 428/15 X |
| 3,562,379 | 2/1971 | Duggins | 428/15 X |
| 3,670,060 | 6/1972 | Cuffaro | 428/15X |
| 3,732,908 | 5/1973 | White | 264/119 XR |
| 3,847,865 | 11/1974 | Duggins | 428/15 XR |
| 4,085,181 | 4/1978 | Cosentino | 264/245 XR |
| 4,375,516 | 3/1983 | Barrall | 501/84 |
| 4,469,656 | 9/1984 | Ishii | 264/119 XR |
| 3,718,496 | 2/1973 | Willard | 428/172 |
| 3,775,364 | 11/1973 | Duggins | 524/425 |
| 4,188,316 | 2/1980 | Sawada | 428/15 X |
| 4,420,341 | 12/1983 | Ferrigno | 428/15 X |
| 4,473,673 | 9/1984 | Williams et al. | 523/319 X |
| 4,490,410 | 12/1984 | Takiyama et al. | 428/15 X |
| 4,643,921 | 2/1987 | Terabe et al. | 524/451 X |

*Primary Examiner*—Henry F. Epstein

[57] ABSTRACT

A shaped article of solid ceramic-like material having indentations or fissures of irregular shape and depth, the indentations produced by chemical reaction; and process of manufacture.

3 Claims, 2 Drawing Sheets

SIMULATED MARBLE AND PROCESS OF PREPARATION

This invention relates to a simulated or artificial marble product and more particularly, to an improved method of forming a simulated marble resembling travertine marble.

BACKGROUND OF THE INVENTION

Since ancient times, marble has been extensively used for building and ornamental purposes. Its great beauty and durability make natural marble a highly desirable product for these purposes. However, as a product of nature, marble is commonly nonhomogeneous, possesses fractures and impurities that may adversely affect its physical properties. Although it can be cut and shaped to alter its physical appearance, the physical properties of natural marble, like its great beauty, are often non-uniform and unpredictable.

THE PRIOR ART

U.S. Pat. Nos. 3,394,021 and 3,471,307

In U.S. Pat. Nos. 3,394,021 and 3,471,307, the inventors describe methods of forming synthetic marble products by pressing substantially homogeneous particulate mixtures of calcium carbonate with various fluxes for a sufficient time and at selected temperatures and pressures to form a coherent crystalline body. In U.S. Pat. No. 3,394,021, the flux is an alkali metal carbonate; in U.S. Pat. No. 3,471,307, a fluoride flux is used and pressing is followed by sintering.

Natural marble is a metamorphic rock formed essentially from the recrystallization of limestone. The limestone, under elevated pressure and high temperature, becomes "plastic" and, over a long time period, this "plastic" material subsequently solidifies and recrystallizes incorporating impurities within the product and occasionally yielding products with fractures of varying depths. These prior art processes described in U.S. Pat. Nos. 3,394,021 and 3,471,307 tend to avoid the impurity and fracture problem, but provide a product that requires other additions and/or treatments to give the synthetic marble the appearance of natural marble.

U.S. Pat. Nos. 3,670,060 and 4,643,921

U.S. Pat. Nos. 3,670,060 and 4,643,921 are representative of processes for preparing artificial or simulated marble articles composed of a resin or polymeric matrix and a filler or fillers of powdered limestone, clay, silica, alumina or the like distributed throughout the matrix. It will be noted that in order to obtain the appearance of natural marble, a complicated procedure involving a plurality of individual batches of color components are used in U.S. Pat. No. 3,670,060. To obtain the appearance of natural marble in U.S. Pat. No. 4,643,921, the inventors use 30-70% of a hydrated silica filler in an acrylic or polyester resin, the refractive index of the filler not differing from the refractive index of the resin by more than 0.05.

It is the object of the present invention to provide a simulated marble having the appearance of the natural travertine marble. A further object is to provide such simulated marble wherein the "fractures" or, more accurately, "fissures" are of insufficient depth to affect the physical properties of the marble adversely.

SUMMARY OF THE INVENTION

The objects are accomplished by first preparing a slurry of a blowing agent in a liquid, e.g. one part magnesium carbonate or calcium carbonate in three parts water; screeding the slurry through a silk screen having a pre-deposited image or print displaying mesh openings (usually accomplished photographically) adapted to provide a randomly fissured surface resembling travertine marble, onto a casting surface, e.g. glass, fiberglass-reinforced polyester, polycarbonate (Lexan®, registered by General Electric), acrylic polymer (Plexiglas®, registered by Rohm & Haas, or Lucite® registered by E. I. du Pont de Nemours & Co.), or the like; drying the slurry on the casting surface in the negative image of said pattern; framing the dried slurry in a desired configuration and at a desired height, e.g. to the desired thickness and shape of the ultimate solid product of simulated marble; preparing two components (1) a reaction solution of alumina or its trihydrate, phosphoric acid and water, plus (2) a mixture of magnesium oxide and calcium silicate; mixing the two components at a temperature and for a period necessary to provide a viscosity of the mix between 350,000 and 600,000 poises; pouring the mix at said viscosity onto the casting surface containing the dried blowing agent in the pre-arranged pattern enscribed by the frame; allowing the viscous mixture to solidify, reaction of the solidifying viscous mixture with the blowing agent producing a substantially solid phosphate bonded material having a fissured surface resembling travertine marble.

In the broadest sense, the invention involves the formation of a solid ceramic-like shaped article having indentations or fissures of irregular shape and depth, usually in a random arrangement, the indentations producted by chemical reaction.

Although this article has been formed in a batch process, it is conceivable that either a batch or continuous process may be used. Thus, a slurry of blowing agent or other chemical, reactive with at least one agent in the subsequently used slurry that is adapted to form the solid ceramic-like material when dried, may be screed through a screen having mesh openings onto a stationary casting surface or a moving continuous belt to provide deposits of the chemical corresponding to the openings. The deposits are allowed to dry. Then, when the slurry that will form the solid ceramic-like article is cast within a framed area on the casting surface or on the continuous belt, the chemical within the last-cast slurry reacts with the chemical deposits on the casting surface or the belt to form indentations in the pre-arranged pattern on the surface of the solid ceramic-like article produced from the last-cast slurry.

At least in theory it should be possible to cast a chemical-filled polymeric material, e.g. calcium carbonate-filled acrylic polymer (e.g. Corian® registered by E. I. du Pont de Nemours & Co.), onto a stationary or moving surface having deposits of a solid chemical reactive with the calcium carbonate in the polymeric material to emit a gas and form the indentations or fissures in the solidifying polymeric material. Thus, one would form the veined, smooth surface characteristic of Corian® on the upper surface and the random fissured surface characteristic of travertine marble on the other surface.

It should be understood that in order to obtain the sharp fissures characteristic of travertine marble, it is imperative that the chemical reaction forming the fissures occurs almost simultaneously with the solidification of the ceramic-like material. This is true whether this material is the inorganic phosphate bonded material described earlier or the organic acrylic described above or any other polymeric material.

DESCRIPTION OF EMBODIMENTS

The components used to practice the present invention are all commercially available. Calcium silicate is preferred in practicing the present invention although other calcium compounds may also give satisfactory results. Calcium silicate occurs naturally and is referred to as wollastonite. Suitable products can be obtained when this material is used in powdered form as described below.

A number of metal oxides may be used in the invention. Thus, although aluminum oxide hydrate is preferred in the reaction solution, calcium oxide or its hydrate may also be used to obtain satisfactory phosphate ceramic material. And although magnesium oxide is preferred in the substantially dry mixture, zinc oxide is a more expensive alternative. These oxides are preferably used in powdered form, with finer particle-size oxides on the order of 200-mesh (Tyler Standard) or smaller, giving generally superior results. Hydrated forms of the oxide may also be used and in many instances are preferred. In the event that a hydrate is used, the water of hydration must be taken into account so as not to provide excess water for the reaction. This may be conveniently done by including the water of hydration when calculating the phosphorous pentoxide content of the phosphoric acid solution.

From about 5 to about 20 parts by weight of the metal oxide hydrate (in relation to 100 parts of calcium silicate) may be used in the reaction solution and from about 15 to about 25 parts of metal oxide may be used in the relatively dry mixture with 100 parts of calcium silicate to practice the present invention. However, from about 7 to 22 parts of metal oxide hydrate in the solution and from about 8 to 17 parts of metal oxide in the mixture are preferred. The amount of oxide or hydrate that is used will depend on its reactivity and whether it is in the dry or hydrated form.

Phosphoric acid is available in a variety of concentrations, 85% being the most common concentration for ortho-phosphoric acid. Other compositions, such as polyphosphoric acid, which will yield phosphoric acid upon dilution with water may also be operable in the present invention, provided that the overall water content of the reaction system is not too high. Too much water must be avoided because products will be obtained which, even though water resistant, will have poor strength.

As a general rule, the phosphoric acid will be suitable if it contains the equivalent of from about 40 to about 75% by weight of phosphorous pentoxide based on the weight of the acid solution. Preferably, the equivalent of phosphorous pentoxide will be about 50-72%, and more preferably about 55-70%. The remaining portion of the acid solution comprises water, including, for purposes of calculation, any water of hydration from the metal oxide. From about 100 to about 125 parts of the acid solution may be used, but preferably from about 115 to about 122 parts will be used.

BRIEF DESCRIPTION OF THE DRAWINGS

The invention will be more clearly understood by referring to the drawing and the discussion that follows.

In the drawings.

Figure 1:
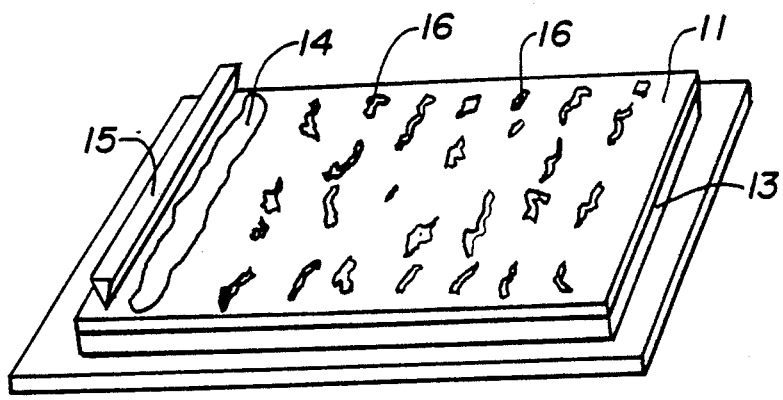
FIG. 1 represents, in perspective, the arrangement of the patterned silk screen on a support prior to screeding with the carbonate blowing agent.

In the process for preparing the marble of this invention, the first step is to place the silk screen 11, shown in FIG. 1, having the pattern or image of the surface desired for the simulated marble 12 over a substantially smooth-surfaced support 13. The blowing agent, magnesium carbonate or calcium carbonate, one part mixed with three parts of water to form a slurry 14, is fed onto a portion of the silk screen 11. The squeegee blade 15 is moved such that the slurry 14 is forced through the mesh openings of the patterned portion of the silk screen leaving deposits of the carbonate slurry 14 where the openings 16 appear on the patterned portion of the silk screen.

Figure 2:
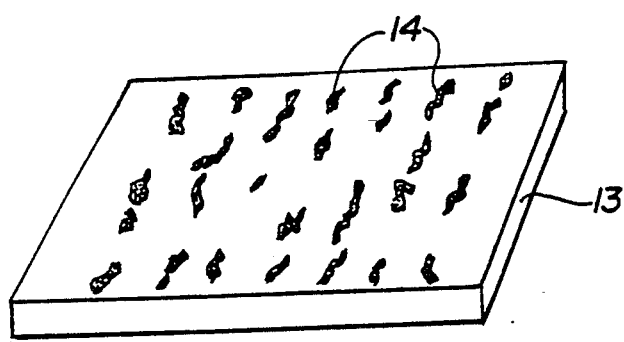
FIG. 2 represents the support, on which the "random" deposits of carbonate have dried in the negative pattern or image of the silk screen.

In FIG. 2, the silk screen has been removed leaving the solidified deposits of carbonate 14 on the glass support 13.

Figure 3:
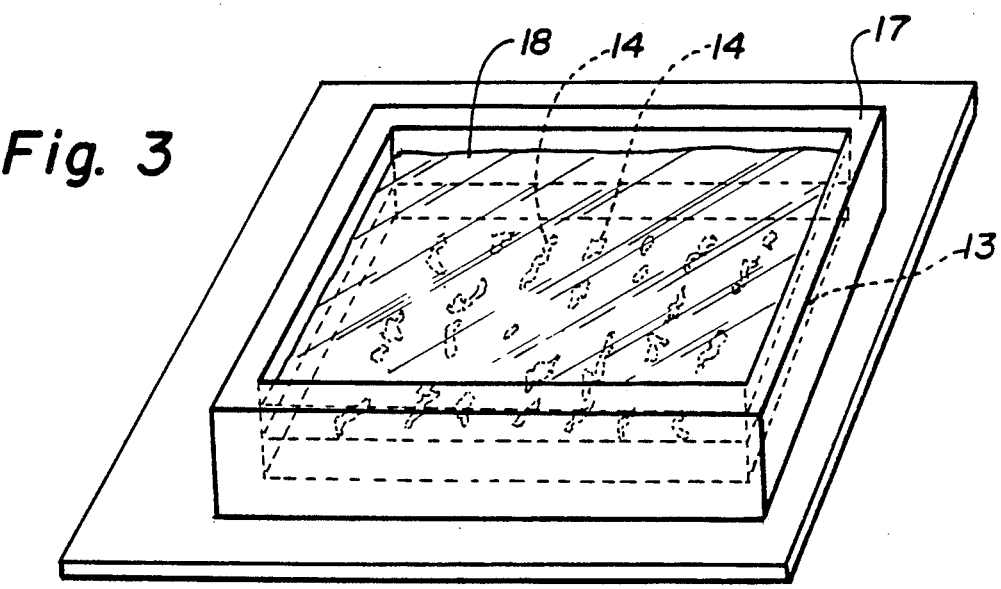
FIG. 3 represents the support with a frame having the height and outlining the shape desired for the simulated marble solid product surrounding the "random" carbonate deposits and into which the slurry of the so-called "phosphate bonded material" has been poured.

In FIG. 3, a frame 17, usually a wooden frame, is placed in any desired height and form on the support 13 to enscribe a substantial number of deposits 14. Thereafter, a slurry 18, prepared from the two components—the reaction solution and the mixture—that will make up the phosphate bonded material (PBM), is fed within the confined area of the frame 17. The PBM may be prepared by any of the processes covered or disclosed in U.S. Pat. No. 4,375,516, except that the foaming agent, e.g. magnesium carbonate, is omitted.

The reaction solution is prepared from aluminum oxide trihydrate, 9.34 g., and phosphoric acid (85%), 46.7 g., and water, 12.71 g. A quantity of surfactant may be added to the reaction solution, if desired.

The second component, the so-called dry mixture, is prepared from calcium silicate, 62.1 g., silica, 61.7 g., magnesium oxide, 4.5 g., magnesium chloride, 6.25 g., and milled fibers, 0.08 g.; and the slurry 18, obtained by rapidly mixing the two components, is immediately poured within the frame 17 onto the casting surface 13. The viscosity of the mix 18 was between 350,000 and 600,000 poises.

Figure 4:
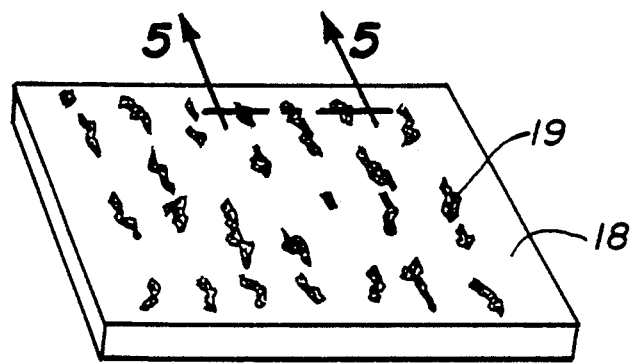
FIG. 4 represents the phosphate bonded material after solidification, with the surface, that had previously been in contact with the support, showing.

In FIG. 4, the mix 18 has been allowed to solidify, removed from the casting surface 13 and turned over to show the indented areas or fissures 19 in the solid PBM that results from the reaction of the deposits of carbonate 14 with the PBM slurry 18.

Figure 5:
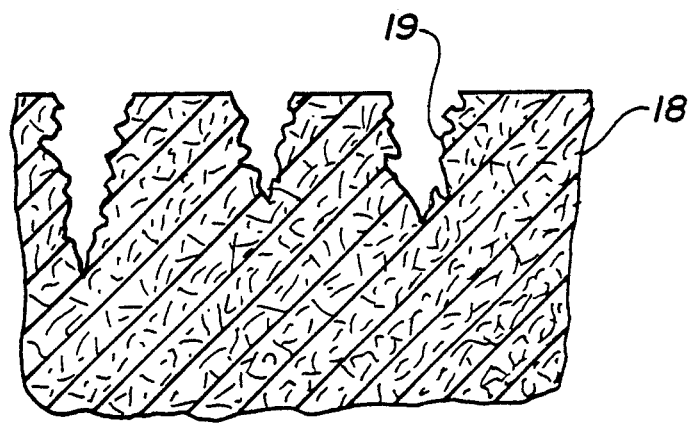
FIG. 5 represents a cut-away of the solid product shown in FIG. 4 in side view cut, as shown by the arrows marked "5" in FIG. 4.
Figure 6:
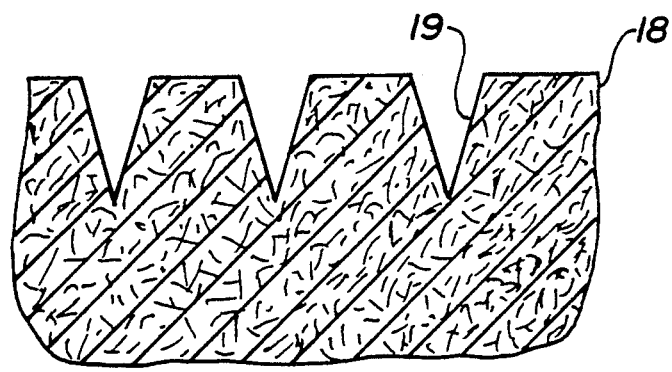
FIG. 6 represents a similar cut-away as in FIG. 5 wherein the fissures have been produced physically by mechanical punching.

FIG. 5 is an enlargement of the simulated marble of this invention to be compared to a PBM material shown in FIG. 6 in which the indented areas 19 have been produced by mechanical punching. It will be observed that the unique etched effect of the ceramic material's surface produces a natural pattern of indentations or fissures of varying depth 20 characterized by undercuts 21 only achievable heretofore in natural traventine marble.

What is claimed is:

1. A shaped solid simulated travertine marble article having surface indentations of irregular shape and depth wherein said solid material is phosphate bonded material and said indentations are produced by the generation of at least carbon dioxide from the chemical reaction of magnesium or calcium carbonate with phosphoric acid during formation of said phosphate bonded material.

2. A process for preparing a simulated marble article having a fissured surface and resembling travertine marble which comprise the following steps: 1) preparing a first slurry of a magnesium or calcium carbonate in water; 2) screeding said first slurry through a screen having a specified thickness and mesh openings in a pre-arranged pattern onto a casting surface to provide deposits of the carbonate on said casting surface having substantially the thickness of said screen and in the pre-arranged pattern corresponding to the openings in the screen; 3) drying or permitting said carbonate deposits to dry; 4) framing said pattern of solid deposits of dried slurry in a desired configuration and at a desired height corresponding to the desired configuration and height of the simulated marble article; 5) preparing two components (1) a reaction solution of alumina, phosphoric acid and water and (2) a mixture of magnesium oxide and calcium silicate; 6) mixing said two components at a temperature and for a period necessary to provide a viscosity of the mix between 350,000 and 600,000 poises; 7) pouring said mix onto the framed area of said casting surface; 8) allowing said mix to solidify while the reaction of said solidifying mix and said carbonate deposits generates at least carbon dioxide to produce a substantially solid article having a fissured surface, said article resembling travertine marble.

3. A process for preparing a simulated marble article having a fissured surface and resembling travertine marble which comprises the following steps: 1) preparing a first slurry of a solid carbonate dispersed in an aqueous liquid; 2) screeding said first slurry through a screen having a specified thickness and mesh openings in a pre-arranged pattern onto a casting surface to provide deposits of the carbonate on said casting surface having substantially the thickness of said screen and in the pre-arranged pattern corresponding to the openings in the screen; 3) drying or permitting said carbonate deposits to dry; 4) framing said pattern of solid deposits of dried slurry in a desired configuration and at a desired height corresponding to the configuration and height of the desired simulated marble article; 5) preparing a second slurry in a liquid medium having dispersed therein at least one acid-containing material reactive with said carbonate deposits, said second slurry also being adapted to solidify into a solid article when dried; 6) pouring said second slurry onto the framed area of said casting surface; 7) allowing said second slurry to solidify while the reaction of the acid-containing material therein and said carbonate deposits generates at least carbon dioxide to produce a substantially solid article having a fissured surface, said article resembling travertine marble.

* * * * *